United States Patent
Harrigan et al.

(10) Patent No.: US 10,705,298 B1
(45) Date of Patent: Jul. 7, 2020

(54) FIBER OPTIC PROTECTIVE BOX FOR CORE-STIFFENED COMPOSITE STRUCTURES

(71) Applicant: LOCKHEED MARTIN CORPORATION, Bethesda, MD (US)

(72) Inventors: Matthew P. Harrigan, Rochester, NY (US); Nathaniel Dew, Stratford, CT (US); Eric C. Schenck, Rochester, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/395,430

(22) Filed: Apr. 26, 2019

(51) Int. Cl.
| | |
|---|---|
| G02B 6/36 | (2006.01) |
| G02B 6/26 | (2006.01) |
| G02B 6/44 | (2006.01) |
| G02B 6/38 | (2006.01) |
| G02B 6/12 | (2006.01) |

(52) U.S. Cl.
CPC ............ G02B 6/3696 (2013.01); G02B 6/26 (2013.01); G02B 6/3897 (2013.01); G02B 6/4471 (2013.01); G02B 2006/12138 (2013.01)

(58) Field of Classification Search
None
See application file for complete search history.

(56) References Cited

U.S. PATENT DOCUMENTS

| | | | | |
|---|---|---|---|---|
| 4,537,469 A | * | 8/1985 | Kircher | ............... B64C 1/06 385/13 |
| 5,399,854 A | * | 3/1995 | Dunphy | .................. G01K 5/72 250/227.17 |
| 5,604,836 A | * | 2/1997 | Dunphy | ................ G02B 6/3644 385/138 |
| 5,770,155 A | * | 6/1998 | Dunphy | ............ B29C 35/0288 422/82.05 |
| 6,035,084 A | | 3/2000 | Haake et al. | |
| 6,173,090 B1 | | 1/2001 | Simon et al. | |
| 6,547,448 B2 | | 4/2003 | Gabler | |
| 6,840,683 B2 | * | 1/2005 | Takeda | ...................... G02B 6/43 385/55 |
| 7,039,276 B2 | | 5/2006 | Aldridge et al. | |
| 7,813,598 B2 | * | 10/2010 | Mortensen | ........... G01M 11/086 385/12 |
| 8,172,180 B2 | | 5/2012 | Press | |
| 8,746,991 B2 | | 6/2014 | Takeda et al. | |
| 9,323,021 B2 | * | 4/2016 | Hodge | ................. G02B 6/3874 |
| 9,465,179 B2 | * | 10/2016 | Leigh | ..................... G02B 6/43 |
| 9,500,561 B2 | | 11/2016 | Sutton et al. | |
| 9,575,261 B2 | | 2/2017 | Hodge et al. | |
| 9,720,156 B1 | | 8/2017 | Ross et al. | |
| 2005/0259909 A1 | | 11/2005 | Aldridge et al. | |

* cited by examiner

*Primary Examiner* — Rhonda S Peace
(74) *Attorney, Agent, or Firm* — Cantor Colburn LLP

(57) ABSTRACT

A core-stiffed composite structure includes a plurality of bonded layers forming the core-stiffened composite structure, a fiber optic conductor embedded between two of the plurality of bonded layers, the fiber optic conductor including a terminal end, and a protective box embedded in the core-stiffened composite structure and bonded to one or more of the plurality of bonded layers, wherein the terminal end of the fiber optic conductor projects into the protective box.

3 Claims, 4 Drawing Sheets

US 10,705,298 B1

FIBER OPTIC PROTECTIVE BOX FOR CORE-STIFFENED COMPOSITE STRUCTURES

STATEMENT OF GOVERNMENT SUPPORT

This invention was made with government support under W911W6-16-20017 awarded by the US Army. The government has certain rights in the invention.

BACKGROUND

The subject matter disclosed herein generally relates to the art of core-stiffened composite structures and, more particularly, to a fiber optic protective box provided in a core-stiffened composite structure.

Core-stiffened composite structures are used in a wide array of applications. For example, modern aircraft employ core-stiffened composite structures in the formation of various structural and aerodynamic surfaces. Core-stiffened composite structures may be used to form rotor blades, wings, fuselage panels and the like. Fiber optic sensors may be embedded in, or mounted to, the core-stiffened composite structures. The sensors may be connected to, or formed as part of, fiber optic cables that may run along, and be embedded between, layers which form the core-stiffened composite structure.

Typically, the fiber optic cable exits through a surface of the core-stiffened composite structure at an exit point. A portion of the fiber optic cable at the exit point is prone to breakage. The fiber optic cable is vulnerable to excessive bending and damaging contact that may lead to filament breakage. For example, the fiber optic cable may take a sharp bend at the exit point that increases a likelihood that strain may lead to breakage. Therefore, fiber optic cables are difficult to use in manufacturing and thus have a low reliability when being used in core-stiffened composite structures. Accordingly, the art would appreciate a system that increases fiber optic manufacturability and reliability.

BRIEF DESCRIPTION

According to an embodiment, a core-stiffed composite structure includes a plurality of bonded layers forming the core-stiffened composite structure, a fiber optic conductor embedded between two of the plurality of bonded layers, the fiber optic conductor including a terminal end, and a protective box embedded in the core-stiffened composite structure and bonded to one or more of the plurality of bonded layers, wherein the terminal end of the fiber optic conductor projects into the protective box.

In addition to one or more of the features described above, or as an alternative, in further embodiments the protective box includes a base wall and a side wall that form a connector receiving zone, at least one of the base wall and the side wall including an opening through which passes the terminal end of the fiber optic conductor into the connector receiving zone.

In addition to one or more of the features described above, or as an alternative, in further embodiments a protective box cover may extend over the connector receiving zone and be connected with one of the side wall and the base wall.

In addition to one or more of the features described above, or as an alternative, in further embodiments the protective box cover includes an external surface that is substantially co-planar with the core-stiffened composite structure.

In addition to one or more of the features described above, or as an alternative, in further embodiments a fiber optic connector may be arranged in the connector receiving zone and operatively coupled to the terminal end of the fiber optic conductor.

In addition to one or more of the features described above, or as an alternative, in further embodiments the protective box cover box cover includes at least one surface including a connector outlet that is coupled to the fiber optic connector.

In addition to one or more of the features described above, or as an alternative, in further embodiments the at least one surface projects proudly of the core-stiffened composite structure.

In addition to one or more of the features described above, or as an alternative, in further embodiments the at least one surface is at a non-zero angle relative to the core-stiffened composite structure.

In addition to one or more of the features described above, or as an alternative, in further embodiments the fiber optic conductor includes at least two fiber optic conductors each including a respective terminal end extending into the protective box.

In addition to one or more of the features described above, or as an alternative, in further embodiments a single connector may be arranged in the protective box, wherein only one terminal end of the at least two fiber optic conductor is coupled to the single connector.

In addition to one or more of the features described above, or as an alternative, in further embodiments the core-stiffened composite structure defines an aircraft surface.

In addition to one or more of the features described above, or as an alternative, in further embodiments an amount of cushioning material may be arranged in the connector receiving zone.

In addition to one or more of the features described above, or as an alternative, in further embodiments the amount of cushioning material comprises one of a foam pad and an amount of injected foam.

In addition to one or more of the features described above, or as an alternative, in further embodiments the terminal end includes one or more sensors operable to detect parameters in the connector receiving zone of the protective box.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1:
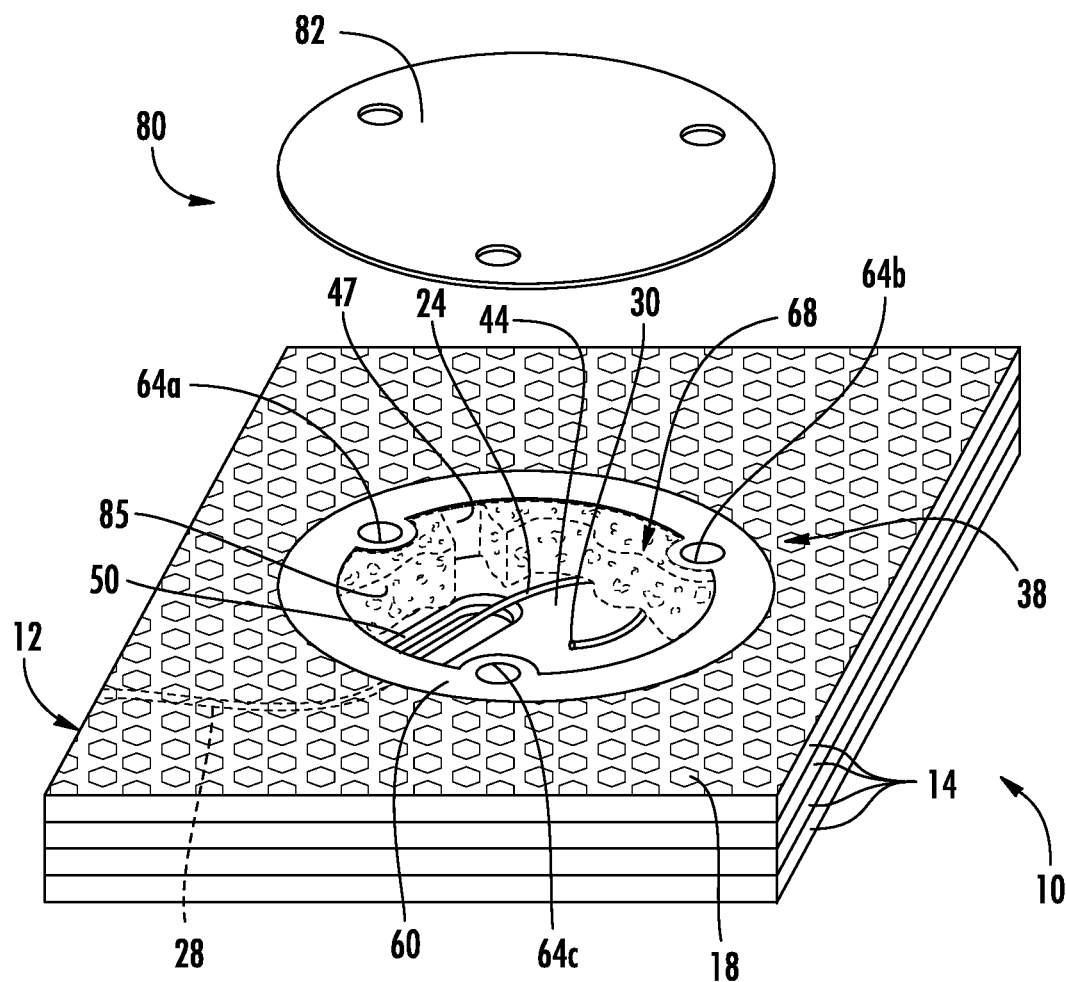
FIG. 1 depicts a portion of a core-stiffened composite structure having a protective box, in accordance with an aspect of an exemplary embodiment.

With initial reference to FIG. 1, a core-stiffened composite structure is indicated generally at 10. Core-stiffened composite structure 10 may form a surface of an air vehicle (not separately labeled). Of course, it should be understood that core-stiffened composite structure 10 may be employed in other applications. In an embodiment, the surface may define an aerodynamic surface 12 such as a wing, a rotor blade, or the like, a control surface, or a fuselage surface. Core-stiffened composite structure 10 is formed from a plurality of bonded layers, four of which are shown at 14. It should be appreciated that the number, orientation, and material of each layer may vary. Core-stiffened composite structure 10 includes an outer surface 18.

In an embodiment, core-stiffened composite structure 10 may support one or more sensors (not shown) that may detect various parameters. For example, the sensors may detect temperature, strain, stress, twist, loading, impacts and the like. The sensors may be positioned to detect a parameter of core-stiffened composite structure 10 as a whole, or may be positioned to detect parameters associated with individual ones of the plurality of layers 14.

In an embodiment, a fiber optic conductor 24 may be embedded between two adjacent ones of the plurality of layers 14. Fiber optic conductor 24 may also be embedded into one of the plurality of layers 14. Fiber optic conductor 24 includes a first end (not shown) that may be buried in core-stiffened composite structure 10, an intermediate portion 28 that extends along core-stiffened composite structure 10, and a terminal end 30 that projects through outer surface 18. Intermediate portion 28 may contain one or more sensors. Alternatively, a sensor (not shown) may be connected to terminal end 30. In yet another embodiment, terminal end 30 may support one or more sensors operable to detect temperature or other localized parameters.

In accordance with an exemplary embodiment, terminal end 30 projects into a protective box or bunker 38 that is embedded in, and bonded to, core-stiffened composite structure 10. Protective box 38 may be formed from a high temperature plastic and includes a base wall 44 and a side wall 47. It should be understood that protective box 38 may be formed from other materials suitable for installation in a core-stiffened composite structure which may be employed in aviation structures. An opening 50 is formed in base wall 44. Terminal end 30 of fiber optic conductor 24 passes through opening 50 into protective box 38. It should be appreciated that while shown formed in base wall 44, the opening may alternatively be formed in side wall 47. In an accordance with an aspect of an exemplary embodiment, protective box 38 may be formed used additive manufacturing techniques.

Figure 2:
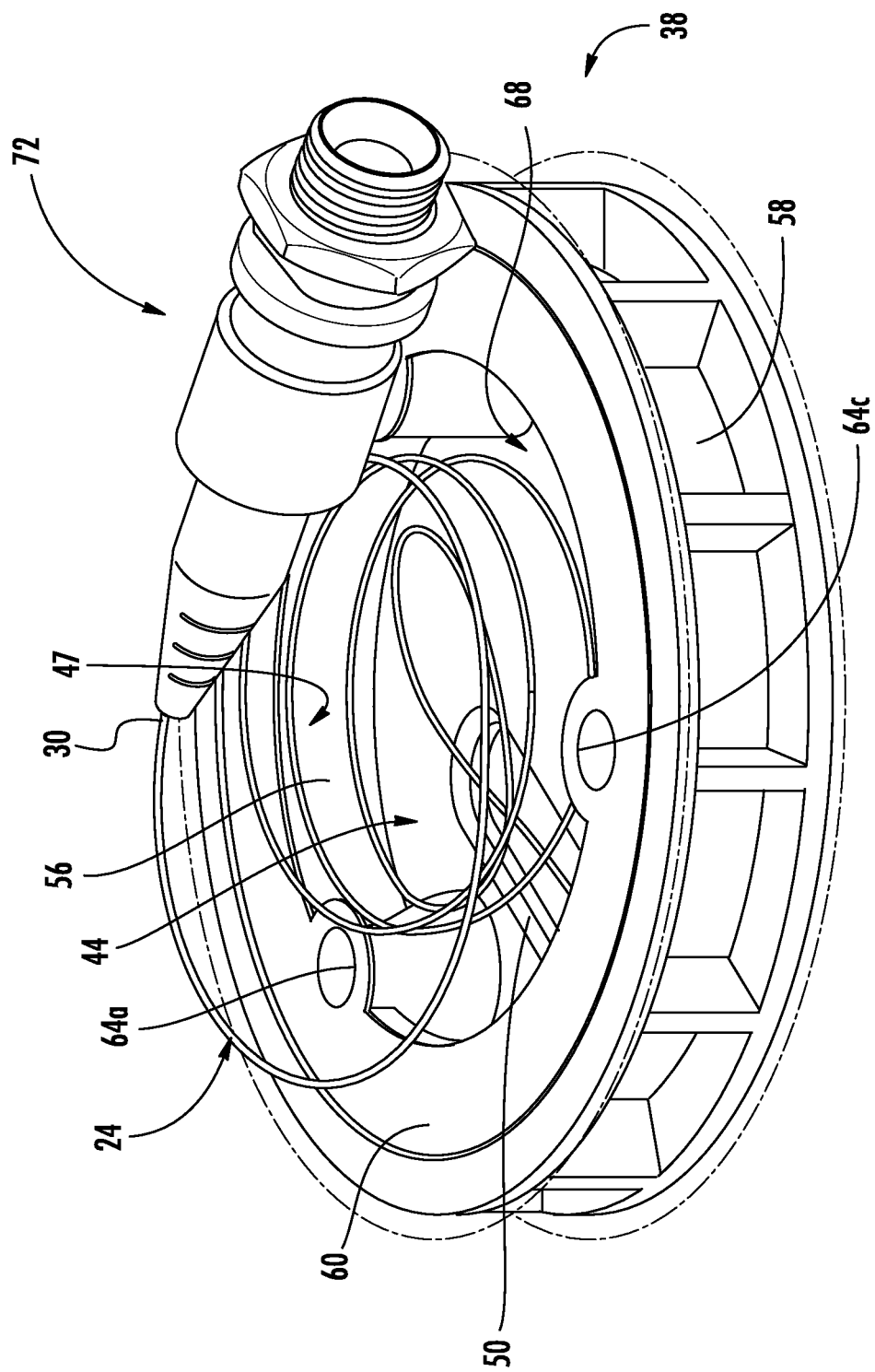
FIG. 2 depicts the protective box of FIG. 1, in accordance with an aspect of an exemplary embodiment.

Referring to FIG. 2 and with continued reference to FIG. 1, side wall 47 includes a substantially continuous inner surface 56 and an outer surface (not separately labeled) including a plurality of recesses 58. Recesses 58 are receptive of bonding material (also not separately labeled) that joins protective box 38 to core-stiffened composite structure 10. Side wall 47 also includes an outer edge 60 having a plurality of openings 64a, 64b, and 64c which will be discussed more fully herein. Base wall 44 and substantially continuous inner surface 56 of side wall 47 define a connector receiving zone 68.

In accordance with an exemplary aspect, a connector 72 is arranged in connector receiving zone 68 and coupled to terminal end 30 of fiber optic conductor 24. Connector 72 may be stored in protective box 38 for future use. In such a configuration, protective box 38 may be provided with a protective box cover 80 having an external surface 82 that is substantially co-planar with outer surface 18. External surface 82 includes a number of openings (not separately labeled) that align with openings 64a-64c. Mechanical fasteners (also not shown) may be used to join protective box cover 80 to protective box 38.

In addition, an amount of a cushioning material 85 may be arranged in connector receiving zone 68 to provide protection to fiber optic conductor 24 and/or connector 72. The cushioning material may take the form of a foam pad, injected foam, or other such material that may be inserted into connector receiving zone 68.

Figure 3:
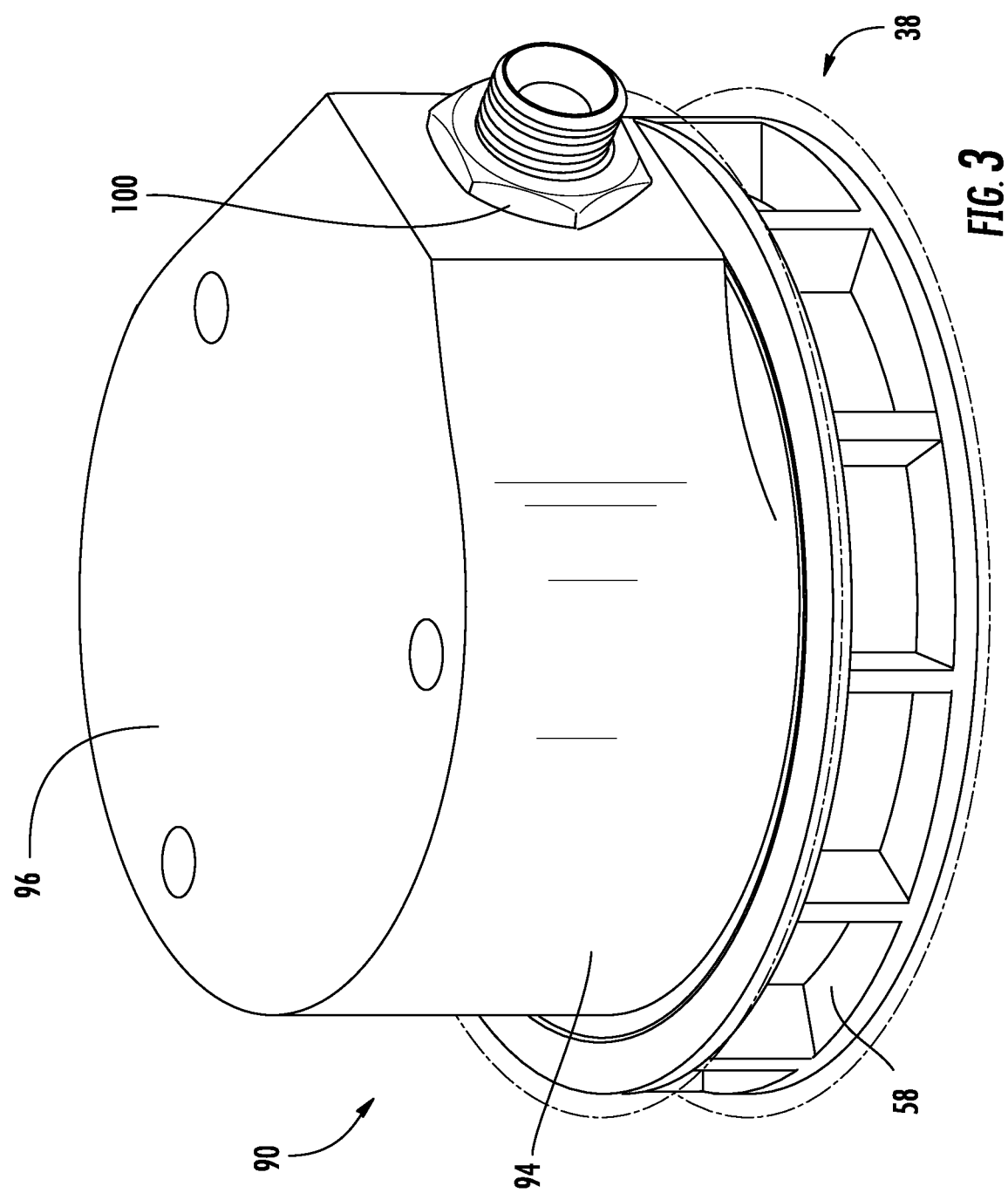
FIG. 3 depicts the protective box of FIG. 2, including a protective box cover, in accordance with an aspect of an exemplary embodiment.

In other configurations, protective box 38 may be provided with a protective box cover 90 such as shown in FIG. 3. Protective box cover 90 includes a side surface 94 and a fastener surface 96. Fastener surface 96 includes a number of openings (not separately labeled) that align with openings 64a-64c. Mechanical fasteners (also not shown) may be used to join protective box cover 90 to protective box 38.

In accordance with an exemplary embodiment, side surface 94 projects proudly of outer surface 18 at a non-zero angle. That is, side surface extends outward from outer surface 18. In the embodiment shown, side surface 94 extends substantially perpendicularly relative to outer surface 18. Side surface 94 may include a connector outlet 100 that is receptive of connector 70. In this manner, another connector (not shown) may be joined to connector 70 that may be employed to transmit signals and/or data from the sensor to a system on, for example, the aircraft.

In an embodiment, connector 70 may interface with sensors that are of a type, and are positioned, to sense various parameters of aircraft components. For example, the sensors may interface with a structural condition monitoring system to monitor parameters of aircraft structural components. That is the sensors may monitor aircraft parametric data, which may include aircraft states, such as velocity, acceleration, attitude, attitude rate of change, control stick position, control commands or the like. In such a configuration, the structural condition monitoring system may, through the sensors, monitor and detect and record flight manual exceedances that require immediate post-flight inspections or maintenance actions such as disclosed in U.S. Patent Application Publication No. 2017/0183107 entitled "System and Method for Health Assessment of Aircraft Structure" also incorporated herein by reference in its entirety.

In another exemplary aspect, connector 70 may interface with sensors that are of a type and positioned to monitor low-cycle fatigue in an aircraft component. The sensors may detect and record data associated with load order and load magnitude for each maneuver of the aircraft. The sensors may interface with a controller that can determine low-cycle fatigue damage on a maneuver to maneuver basis such as disclosed in U.S. Pat. No. 10,167,909 entitled "Systems and Methods for Fatigue Monitoring" incorporated herein by reference in its entirety. The sensors for each system may form part of, or interface with conductors that are arranged in the core-stiffened composite structure 10. Bunker(s) 38 provide access to connectors associated with the conductors or the conductors themselves. Further, the bunker(s) 38 provide a safe area in core-stiffened composite structure 10 to store and/or house terminal ends of back up or redundant conducts that may be used in the event of a conductor/sensor failure.

Figure 4:
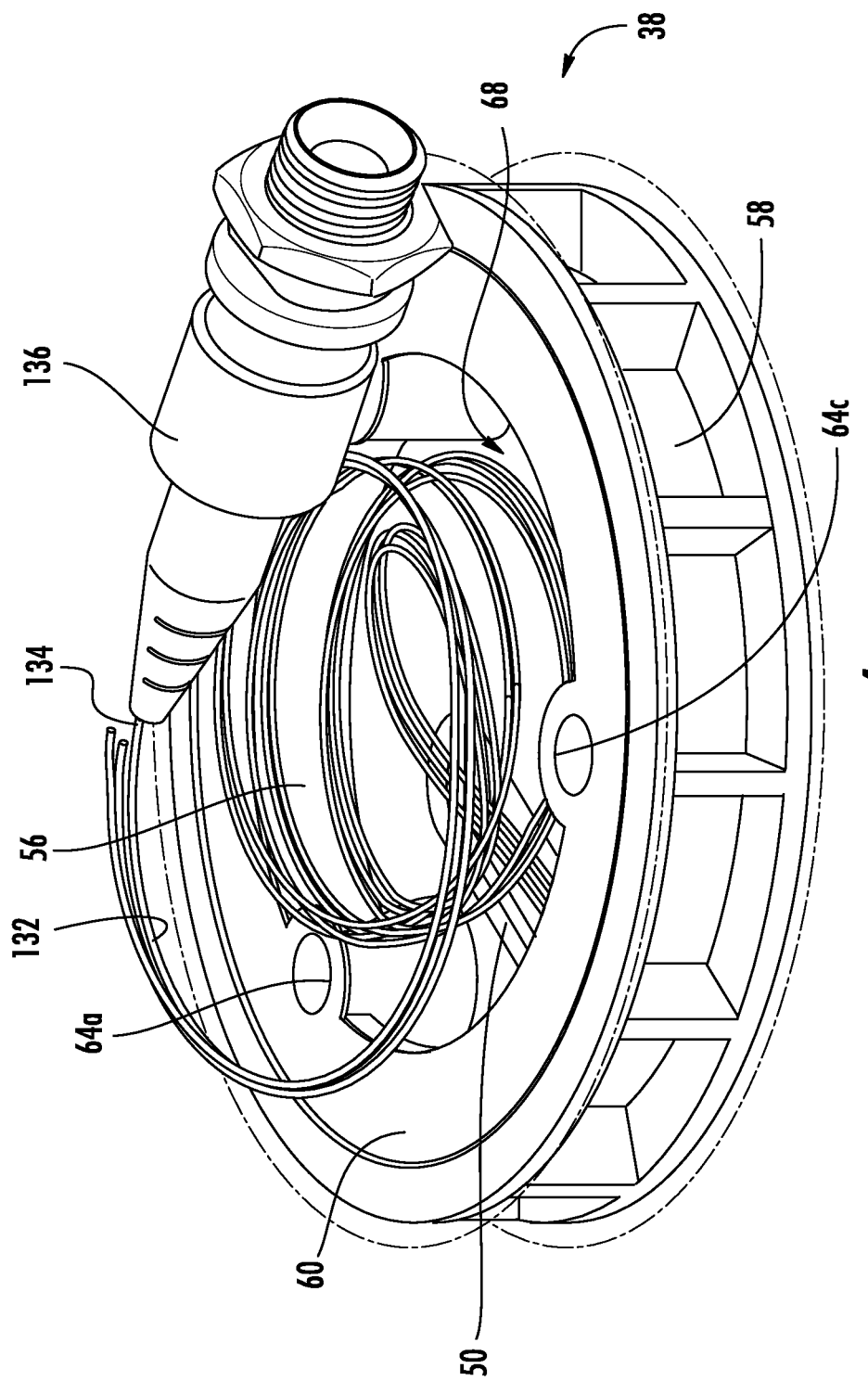
FIG. 4 depicts a protective box housing a plurality of conductors, in accordance with an aspect of an exemplary embodiment.

In FIG. 4, a plurality of fiber optic conductors, one of which is indicated at 132 terminate within protective box 38. Each of the plurality of fiber optic conductors extends through core-stiffened composite structure 10 toward a sensor. In an embodiment, each of the plurality of fiber optic conductors is connected to a sensor and include an associate terminal end 134 supporting a connector. In another embodiment, only one of the plurality of fiber optic cables 132 is connected to a sensor. In this case, a single connector 136 may be connected to terminal end 134. With this arrangement, the others of the plurality of fiber optic conducts 132 may be used as back up conductors.

At this point, it should be understood that the exemplary embodiments describe a protective box that may be embedded in a core-stiffened composite structure. The protective box provides a "soft" egress for fiber optic conductors. The "soft egress" essentially allow for a longer cable bend thereby eliminating sharp corners and bends that could create areas of weakness and potential failure points as well as reduce efficacy of light transmission. The protective box also allows the terminal end of the fiber optic conductor to have a length that is receptive to repair. For example, the terminal end of the fiber optic conductor may be 6-inches (13.44-cm) allowing for repair in the event a break occurs. Further, the protective box may provide a sheltered storage area for additional fiber optic conductors that may be used in the event of a conductor failure.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A core-stiffened composite structure comprising:
   a plurality of bonded layers forming the core-stiffened composite structure;
   a fiber optic conductor embedded between two of the plurality of bonded layers, the fiber optic conductor including a terminal end;
   a protective box embedded in the core-stiffened composite structure and bonded to one or more of the plurality of bonded layers, the protective box including a base wall and a side wall that form a connector receiving zone, at least one of the base wall and the side wall including an opening through which passes the terminal end of the fiber optic conductor into the connector receiving zone wherein the terminal end of the fiber optic conductor projects into the protective box; and
   a protective box cover extending over the connector receiving zone and connected with one of the side wall and the base wall, the protective box cover including an external surface that is substantially co-planar with the core-stiffened composite structure, wherein the protective box cover includes a plurality of openings that register with the plurality of openings in the side wall.

2. The core-stiffened composite structure according to claim 1, wherein the plurality of openings in the protective box cover and the plurality of openings in the side wall may be receptive of mechanical fasteners that join the protective box cover to the protective box.

3. A core-stiffened composite structure comprising:
   a plurality of bonded layers forming the core-stiffened composite structure;
   a fiber optic conductor embedded between two of the plurality of bonded layers, the fiber optic conductor including a terminal end; and
   a protective box embedded in the core-stiffened composite structure and bonded to one or more of the plurality of bonded layers, the protective box including a base wall and a side wall that form a connector receiving zone, at least one of the base wall and the side wall including an opening through which passes the terminal end of the fiber optic conductor into the connector receiving zone, wherein the terminal end of the fiber optic conductor projects into the protective box;
   a protective box cover extending over the connector receiving zone and connected with one of the side wall and the base wall, the protective box cover including at least one surface that projected proudly of and is at a non-zero angle relative to, the structure, the at least one surface having a connector outlet that is coupled to the fiber optic connector; and
   a fiber optic connector arranged in the connector receiving zone and operatively coupled to the terminal end of the fiber optic conductor, wherein the protective box cover includes a side surface and a fastener surface, the side surface defining the at least one surface at the non-zero angle and the fastener surface extending substantially parallel to and spaced from an external surface of the core-stiffened composite structure.

* * * * *